(12) United States Patent
Gülich

(10) Patent No.: US 7,434,479 B2
(45) Date of Patent: Oct. 14, 2008

(54) METHOD AND AN ARRANGEMENT FOR THE FLOW MONITORING OF MULTIPHASE MIXTURES

(75) Inventor: Johann Gülich, Villeneuve (CH)

(73) Assignee: Sulzer Pumpen AG, Winterthur (CH)

( * ) Notice: Subject to any disclaimer, the term of this patent is extended or adjusted under 35 U.S.C. 154(b) by 0 days.

(21) Appl. No.: 11/345,134

(22) Filed: Jan. 31, 2006

(65) Prior Publication Data

US 2006/0248963 A1 Nov. 9, 2006

(30) Foreign Application Priority Data

Jan. 31, 2005 (EP) .................................. 05405047

(51) Int. Cl.
G01F 1/44 (2006.01)
G01F 1/37 (2006.01)
(52) U.S. Cl. .................................. 73/861.63; 73/861.52
(58) Field of Classification Search .................. None
See application file for complete search history.

(56) References Cited

U.S. PATENT DOCUMENTS

| 3,643,507 | A | * | 2/1972 | Garrett | 73/861.04 |
|---|---|---|---|---|---|
| 3,747,406 | A | * | 7/1973 | Maurer | 73/861.48 |
| 4,050,896 | A | | 9/1977 | Raffel et al. | |
| 4,168,624 | A | | 9/1979 | Pichon | |
| 5,099,697 | A | | 3/1992 | Agar | |
| 5,353,646 | A | * | 10/1994 | Kolpak | 73/861.04 |
| 5,551,305 | A | * | 9/1996 | Farchi et al. | 73/861.04 |
| RE36,597 | E | * | 3/2000 | Agar et al. | 73/861.04 |
| 6,234,030 | B1 | * | 5/2001 | Butler | 73/861.04 |
| 6,345,536 | B1 | | 2/2002 | Morrison et al. | |
| 6,383,262 | B1 | * | 5/2002 | Marthinsen et al. | 95/254 |
| 6,422,092 | B1 | * | 7/2002 | Morrison et al. | 73/861.04 |
| 6,502,467 | B1 | | 1/2003 | Fincke | |

* cited by examiner

Primary Examiner—Harshad Patel
(74) Attorney, Agent, or Firm—Townsend and Townsend and Crew, LLP

(57) ABSTRACT

An arrangement (10) for the determination of the mass flow and of the gas/liquid ratio in a multiphase mixture during conveying includes—in the conveying direction (9)—a first venturi nozzle (5.1), a pump (1) and, after the pump, a second venturi nozzle (5.2).

21 Claims, 3 Drawing Sheets

METHOD AND AN ARRANGEMENT FOR THE FLOW MONITORING OF MULTIPHASE MIXTURES

BACKGROUND OF THE INVENTION

The invention relates to a method and to an arrangement for the determination of the mass flow and the gas/liquid ratio in a multiphase mixture during conveying and to a conveying system for multiphase mixtures to carry out a method of this kind or including an arrangement of this kind.

The problem occurs in the conveying of multiphase mixtures such as crude oil, which also contains natural gas and frequently also water in addition to crude oil, that not only the total mass flow has to be determined, but also the gas/liquid ratio in the conveyed multiphase mixture. The knowledge of the mass flow and of the gas/liquid ratio is of great practical significance, for example for invoicing, for the control of the multiphase pump and for the process control, in particular for the setting of the conveying rate and for the quality monitoring.

An apparatus for the mixing and measurement of a multiphase fluid is known from WO 90/13859 which has a vessel, to which the gaseous and liquid portions are supplied, and a perforated header to drain the gaseous and liquid portions out of the container and to mix them. There are provided downstream of the header: a venturi nozzle to determine the mass flow and a densitometer to measure the density of the multiphase fluid. The apparatus known from WO 90/13859 has the disadvantage that a densitometer is used which works e.g. with gamma rays and requires high costs and a corresponding service effort.

In the publication WO 95/26494, an apparatus and a method are disclosed for the mixing, measurement and conveying of a multiphase mixture which use a buffer tank for the separation of the liquid and gaseous portions. The mass flow of the gaseous portion is detected separately in this method before the liquid and gaseous portions are combined together in a header again and conveyed on. Furthermore, the total mass flow can be calculated from the pressure of the gaseous portion, the pressure in the header and the level of the liquid in the buffer tank and from a venturi measurement.

The methods and apparatuses known from the prior art for the determination of the mass flow and of the gas/liquid ratio in a multiphase mixture have the disadvantage that they are complex and costly and, depending on the design, require a relatively large separator container and/or a cost-intensive and service-intensive densitometer. Moreover, the accuracy of the conventional methods is limited.

SUMMARY OF THE INVENTION

It is an object of the present invention to provide a method and an arrangement for the determination of the mass flow and the gas/liquid ratio in a multiphase mixture during conveying and a conveying system for multiphase mixtures to carry out a method of this kind and/or including an arrangement of this kind, which avoid the disadvantages of the prior art.

In the method in accordance with the invention for the determination of the mass flow and of the gas/liquid ratio in a multiphase mixture during conveying, the pressure of the multiphase mixture is increased or reduced between two measuring points and a respective measured parameter is detected at the two measuring points which is correlated with the volume flow, in particular with the total volume flow or with the flow rate, in particular with the flow rate of the multiphase mixture. The gas/liquid ratio and/or the volume flow of the liquid phase and of the gas phase and/or the mass flow of the liquid phase and of the gas phase is then determined on the basis of the detected measured parameters. A pump, in particular a pump for multiphase mixtures, or a turbine, in particular an expansion turbine, can, for example, be used to increase or reduce the pressure.

In a preferred embodiment, a respective venturi nozzle and/or an orifice plate and/or a volume flowmeter is/are used for the detection of the measured parameters correlated with the volume flow. Any type of device with a calibrated pressure loss such as nozzles, diaphragms or probes will be understood under the name "orifice plate" in the following. A respective pressure difference in a venturi nozzle and/or a pressure drop over an orifice plate and/or a flow rate and/or the volume flow itself is/are preferably detected as measuring parameters correlated with the volume flow.

The gas/liquid ratio is preferably determined without the use of a separator or of a separation container. The detection of the measurement values can take place in piping, for example. The passage cross-section in the region of the measurement points is preferably varied by no more than 50%, in particular by no more than 20% or 10%.

In a preferred embodiment, the volume flow values of the liquid phase and of the gas phase determined in accordance with the invention or the determined mass flow values of the liquid phase and of the gas phase are used for the regulation and/or monitoring of the pump or turbine.

The invention furthermore includes an arrangement for the determination of the mass flow and of the gas/liquid ratio in a multiphase mixture during conveying in which there are provided one after the other in the conveying direction: a measuring device for the detection of a measurement parameter correlated with the volume flow, in particular with the total volume flow, or with the flow rate, in particular with the flow rate of the multiphase mixture; an apparatus to increase or decrease the pressure; and a further measuring device to detect a measurement parameter correlated with the volume flow, in particular with the total volume flow, or with the flow rate, in particular with the flow rate of the multiphase mixture. The apparatus to increase or reduce the pressure can be implemented, for example, as a pump, in particular as a pump for multiphase mixtures, or as a turbine, in particular as an expansion turbine.

In a preferred embodiment, the arrangement additionally includes a computing unit connected to the measuring devices for the determination, preferably the automatic determination, of the gas/liquid ratio and/or of the volume flow of the liquid phase and of the gas phase and/or of the mass flow of the liquid phase and of the gas phase. The calculating unit 4 is preferably connected to the control of the pump or turbine or is integrated into the control of the same. The volume flow values or the mass flow values of the liquid phase and of the gas phase determined in this manner are expediently used for the regulation and/or monitoring of the pump or turbine.

In a further preferred embodiment, the measuring devices for the detection of the measurement parameters correlated with the volume flow are respectively designed as a venturi nozzle and/or as an orifice plate and/or as a volume flowmeter.

The measuring devices for the detection of the measurement parameters correlated with the volume flow are preferably arranged in piping or the measuring devices are made such that the passage cross-section in the region of the measuring devices does not vary by more than 50%, in particular by no more than 20% or 10%.

The invention furthermore includes a conveying system for multiphase mixtures to carry out one or more of the aforesaid methods and/or containing one or more of the aforesaid arrangements.

The method in accordance with the invention for the determination of the mass flow and of the gas/liquid ratio in a multiphase mixture during conveying has the advantage that it can be carried out in a simple and cost-favorable manner in comparison with conventional methods. The volume flow and the mass flow of the liquid and gaseous portions of the multiphase mixture can be determined in a simple manner from the gas/liquid ratio and the measurement parameters detected. The arrangement in accordance with the invention can be made up in an advantageous manner of standard components which require less additional servicing effort in operation. The arrangement is also cost-favorable because a separator container for the separation of the liquid phase and the gas phase and/or a cost-intensive and service-intensive densitometer is/are omitted and the measuring devices can be installed, for example, in piping.

The invention will be explained in more detail in the following with reference to the embodiment and to the drawing.

DESCRIPTION OF THE PREFERRED EMBODIMENTS

Figure 1:
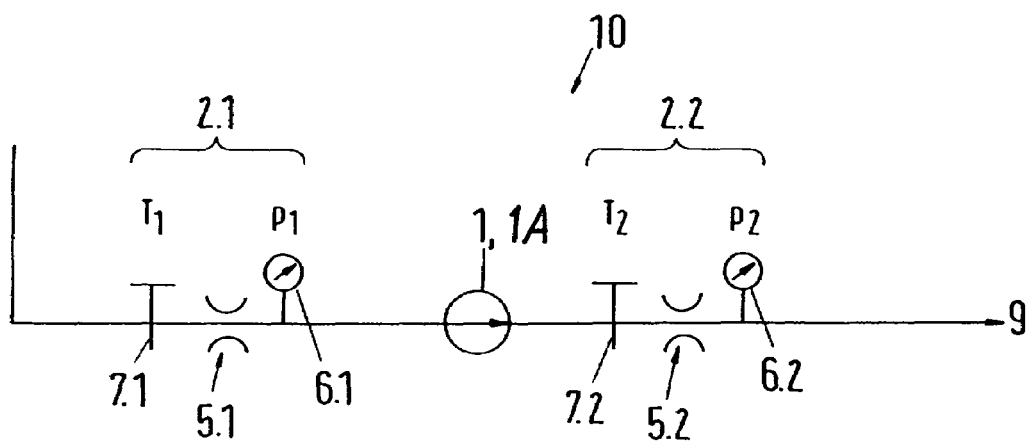
FIG. 1 is a schematic representation of an embodiment of an arrangement in accordance with the present invention.

FIG. 1 shows a schematic representation of an embodiment of an arrangement 10 in accordance with the present invention. There are provided one after the other in this arrangement in the conveying direction 9 at a first measurement point 2.1: a measuring device 5.1 for the detection of a measurement parameter correlated with the volume flow; an apparatus 1 to increase or reduce the pressure; and, at a second measurement point 2.2, a further measuring device 5.2 for the detection of a measurement parameter correlated with the volume flow. In the embodiment, the apparatus 1 to increase or reduce the pressure is designed, for example, as a pump, for example as a pump for multiphase mixtures, or as a turbine, for example as an expansion turbine. Other parts of a conveying system are also suitable to reduce pressure, for example a piping length, and in particular a riser 1A, as long as the ratio of the pressure values present at the two measurement points 2.1 and 2.2 is sufficiently different from 1; for example is larger than 1.4 or smaller than 0.7 and advantageously larger than 2 or smaller than 0.5.

The measuring devices (5.1, 5.2) for the detection of the measurement parameters correlated with the volume flow are made as venturi nozzles in the embodiment. The pressure differential (also called the differential pressure) is detected in a known manner in the venturi nozzles between the inflow pressure and the pressure in the narrowest cross-section. The pressure differential is dependent on the flow speed and thus on the volume flow of the multiphase mixture. Other measuring devices can also be used or other measurement parameters correlated with the volume flow can be detected. For example, pressure drops can be detected by means of one or more orifice plates and/or the flow rates or the volume flow rates can be detected by means of one or more sensors.

In a preferred embodiment, the measurement points 2.1, 2.2 are additionally equipped with a respective pressure sensor 6.1, 6.2 and a temperature sensor 7.1, 7.2. In a further preferred embodiment, the first venturi nozzle is arranged directly before the inlet manifold of the multiphase pump, for example inside a distance L, where L/D<3, so that the behavior of the pump can profit from the homogenization of the flow effected by the venturi nozzle.

For the determination of the gas/liquid ratio and of the mass flow of the liquid phase and of the gas phase, it is assumed that the mass flow is equal at the two measurement points. As a consequence of the pressure increase or of the pressure reduction between the measurement points, the pressure is, however, different at the measurement points. The volume flow of the gas phase is thus also different at the two measurement points. A conditional equation for the gas/liquid ratio can be determined from measurements of the volume flow and/or of a measurement parameter correlated therewith at the two measurement points and the gas/liquid ratio can be determined from the equation. The volume flow of the liquid phase and of the gas phase and/or the mass flow of the liquid phase and of the gas phase can subsequently be determined with the aid of the gas/liquid ratio.

In an analogous manner, a conditional equation for another conveying parameter, for example for the volume flow of the liquid phase or for the volume flow of the gas phase or for the mass flow of the liquid phase or for the mass flow of the gas phase, can be determined from measurements of the volume flow and/or of a measurement parameter correlated therewith at the two measurement points and the respective conveying parameter can be determined from the conditional equation. The remaining conveying parameters can then be calculated with the aid of the conveying parameter calculated in this manner.

The determination of the gas/liquid ratio in particular depends on which measurement parameters correlated with the volume flow are detected at the two measurement points 2.1, 2.2. The procedure for the determination of the gas/liquid ratio will be explained below with reference to the embodiment. In the embodiment, the pressure of the multiphase mixture is increased between the two measurement points 2.1, 2.2 by means of a multiphase pump and the respective pressure differential $\Delta p_1$, $\Delta p_2$ between the inflow pressure and the pressure in the narrowest cross-section of a venturi nozzle 5.1, 5.2 is detected at the two measurement points. In addition, the respective pressure $p_1$, $p_2$ and the respective temperature $T_1$, $T_2$ of the multiphase mixture are measured at the two measurement points. The procedure described is also analogously suitable for the determination of the gas/liquid ratio when different measuring devices are used for the detection of the measurement parameters correlated with the volume flow instead of the venturi nozzles.

In the embodiment shown in FIG. 1, the mass flow $\dot{m}_1$, $\dot{m}_2$ is equal at both measurement points 2.1, 2.2. That is $$\dot{m}_1 = \dot{m}_2 \tag{1}$$

The mass flow of a venturi nozzle results e.g. from the following formula:

$$\dot{m} = A \alpha \epsilon f_{FP} \sqrt{2 \rho_{mix} \Delta p} \tag{2}$$

Used in formula (1), one thus obtains:

$$A_1 \alpha_1 \epsilon_1 f_{FP1} \sqrt{2 \rho_{mix,1} \Delta p_1} = A_2 \alpha_2 \epsilon_2 f_{FP2} \sqrt{2 \rho_{mix,2} \Delta p_2} \tag{3}$$

where $A_1$, $A_2$=cross-section of the venturi nozzle $\alpha_1$, $\alpha_2$=calculated flow count of the venturi nozzle $\epsilon_1$, $\epsilon_2$=expansion coefficient of the venturi nozzle; can be set equal to 1.0, in particular when the flow factor is determined by calibration, as described below, $f_{FP1}$, $f_{FP2}$=flow factor of the venturi nozzle (calibration function)

$\rho_{mix,1}$, $\rho_{mix,2}$=density of the multiphase mixture and $\Delta p_1$, $\Delta p_2$=measured pressure differential of the venturi nozzle.

The density of the multiphase mixture amounts to:

$$\rho_{mix,1} = \frac{\rho_1' Q_1' + \rho_1'' Q_1''}{Q_1' + Q_1''} = \frac{\rho_1' + \rho_1'' GLR_1}{1 + GLR_1} \quad (4a)$$

and $$\rho_{mix,2} = \frac{\rho_1' Q_1' + \rho_1'' Q_1''}{Q_2' + Q_2''} = \frac{\rho_1' + \rho_1'' GLR_1}{\frac{\rho_1'}{\rho_2'}(1 + GLR_2)} \quad (4b)$$

where $\rho_1'$, $\rho_2'$=liquid density $Q_1'$, $Q_2'$=volume flow of the liquid phase $\rho_1''$, $\rho_2''$=gas density $Q_1''$, $Q_2''$=volume flow of the gas phase $GLR_1$, $GLR_2$=gas/liquid ratio.

It should be noted that $\rho_2' Q_2' = \rho_1' Q_1'$ (liquid mass is constant) and $\rho_2'' Q_2'' = \rho_1'' Q_1''$ (gas mass is constant).

The following equation for $GLR_1$ is obtained from equations (3), (4a) and (4b):

$$\frac{\rho_1' + GLR_1 \rho_1''}{1 + GLR_1} - \frac{\rho_1' + \rho_1'' GLR_1}{\frac{\rho_1'}{\rho_2'} + GLR_1 \frac{p_1 T_2}{p_2 T_1}} \left(\frac{A_2 \alpha_2 \epsilon_2 f_{FP2}}{A_1 \alpha_1 \epsilon_1 f_{FP1}}\right)^2 \frac{\Delta p_2}{\Delta p_1} = 0 \quad (5)$$

The gas density $\rho_1''$ can be determined from the relationship $$\rho_1'' = \frac{p_1}{Z R_1 T_1} \quad (6)$$

where

Z=real gas factor $R_1$=universal gas constant/M and M=molecular weight.

The liquid density $\rho_1' = f(p_1, T_1)$ in the function of the pressure and of the temperature is known from material tables.

The equation (5) for $GLR_1$ can be solved with this, for example analytically by solving the corresponding quadratic equation for $GLR_1$, or iteratively, e.g. using one of the conventional spreadsheet programs. The remaining conveying parameters such as volume flow $Q_1'$ of the liquid phase, volume flow $Q_1''$ of the gas phase, mass flow $\dot{m}_1'$ of the liquid phase and mass flow $\dot{m}_1''$ of the gas phase can be calculated from the gas/liquid ratio $GLR_1$ determined in this manner. The following calculation procedure is to be considered only as an example: By inserting $GLR_1$ into equation (4a), $\rho_{mix,1}$ can be determined. By inserting $\rho_{mix,1}$ into equation (2), the total mass flow $\dot{m}_1$ is obtained and from the relationship $$Q_1 = \frac{\dot{m}_1}{\rho_{mix,1}}$$

the total volume flow $Q_1$. The volume flow $Q_1'$ of the liquid phase is now calculated from $$Q_1' = \frac{GLR_1 Q_1}{(GLR_1 + 1)},$$

the volume flow $Q_1''$ of the gas phase from $Q_1'' = GLR_1 Q_1'$, the mass flow $\dot{m}_1'$ of the liquid phase from $\dot{m}_1' = \rho_1' Q_1'$ and the mass flow $\dot{m}_1''$ of the gas phase from $\dot{m}_1'' = \rho_1'' Q_1''$.

The equations (4a) to (6) only apply to the case that the evaporation and condensation in the multiphase mixture and the solution of gases in the multiphase mixture are negligible. If the effects of the evaporation/condensation or of the solutions of gases in the multiphase mixture are not negligible, the same procedure can be carried out for the determination of the gas/liquid ratio as in the embodiment described above, with the gaseous volume flow $Q''$ now consisting of a non-condensed gas portion $Q_g$ and of a condensed gas portion $Q_v$, which is saturated, i.e. $Q''=Q_g+Q_v$.

The liquid density $\rho_1'$ must be known for the determination of the gas/liquid ratio in accordance with the embodiment described above. If the multiphase mixture contains a variable water portion (also called a "water cut"), which is, for example, frequently the case in the conveying of crude oil, the water cut $w_c$ in the liquid phase can be detected by means of a separate measuring sensor in accordance with a further embodiment. The liquid density $\rho_1'$ then results from:

$$\rho_1' = (1-w_c)\rho_{oil} + w_c \rho_{water} \quad (7)$$

Figure 2:
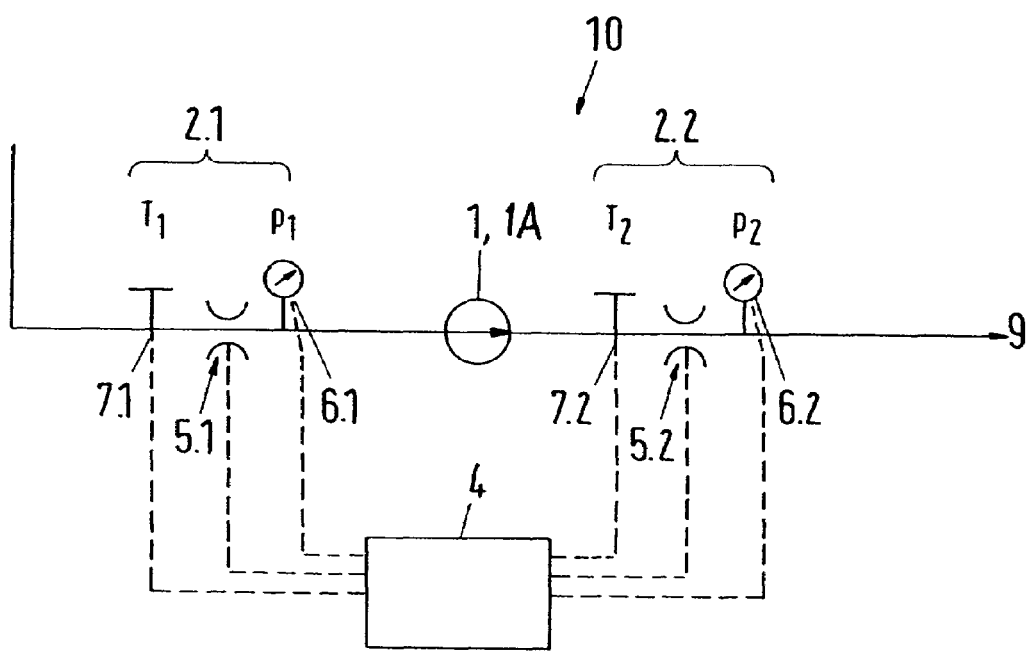
FIG. 2 shows an embodiment with a calculating unit with respect to the embodiment shown in FIG. 1.

In a further preferred embodiment, the measuring sensors of the venturi nozzles 5.1, 5.2, as shown in FIG. 2, are connected to a computing unit 4 in order to evaluate the pressure differentials of the venturi nozzles detected at the two measurement points 2.1, 2.2. The determination of the gas/liquid ratio can take place by means of the computing unit 4 in this case. Further conveying parameters such as volume flow $Q_1'$ of the liquid phase, volume flow $Q_1''$ of the gas phase, mass flow $\dot{m}_1'$ of the liquid phase and mass flow $\dot{m}_1''$ of the gas phase can be calculated from the gas/liquid ratio, as mentioned above. The possibility thus results of automatically and/or continuously monitoring the gas/liquid ratio and, from case to case, further conveying parameters of a multiphase mixture. The measurement points 2.1, 2.2 are advantageously additionally equipped with a respective pressure sensor 6.1, 6.2 and a temperature sensor 7.1, 7.2 which are likewise connected to the calculating unit 4. This arrangement allows an automatic and/or continuous determination of the gas/liquid ratio and, from case to case, of further conveying parameters derived therefrom with a precision improved with respect to conventional processes such as that from WO 95/26494.

Figure 3:
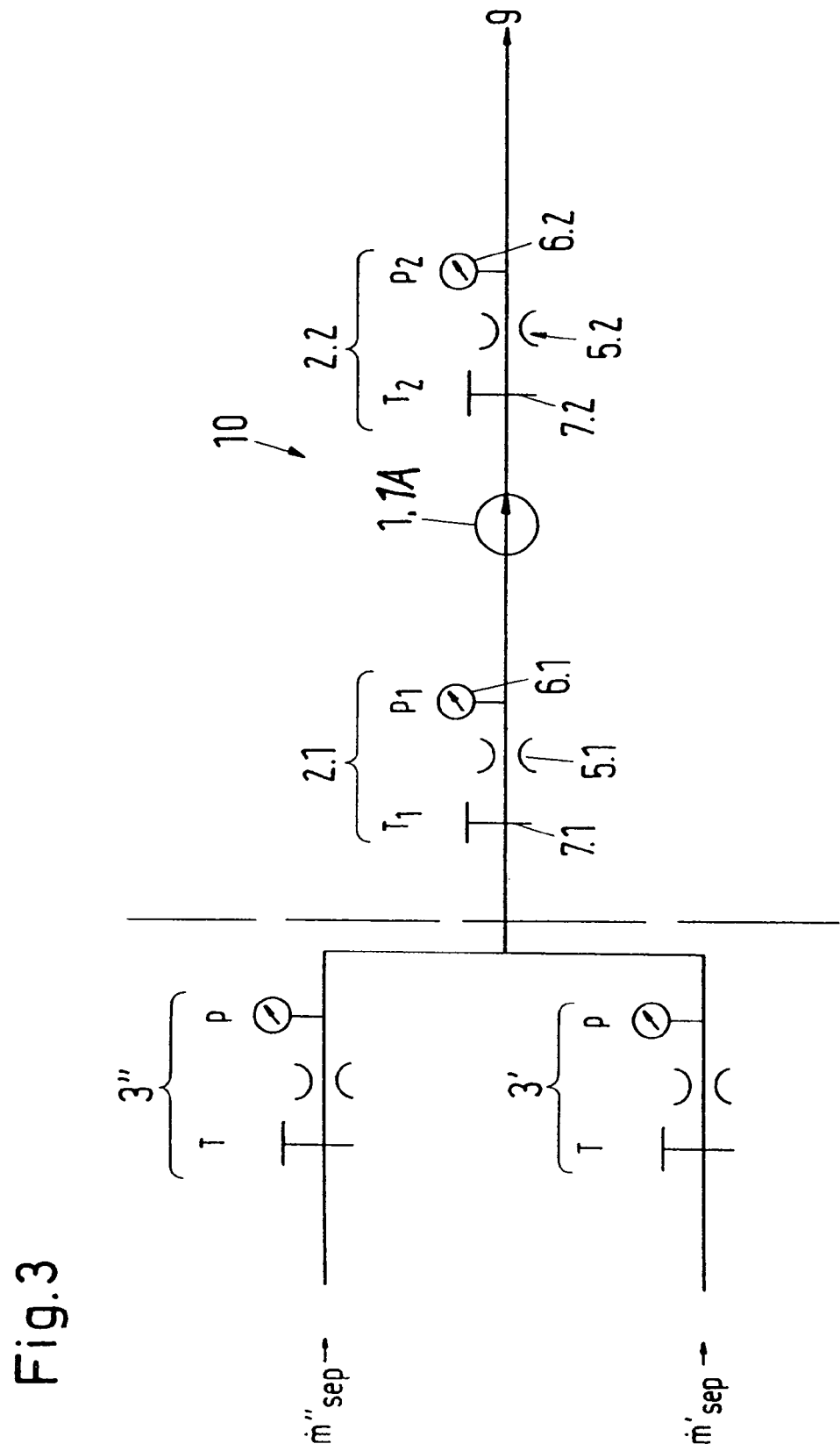
FIG. 3 shows a setup for the calibration of an arrangement in accordance with the present invention.

Since the method described above for the determination of the mass flow and of the gas/liquid ratio can also be used for invoicing, a particular significance attaches to the calibration. FIG. 3 shows a setup for the calibration of an arrangement in accordance with the present invention. In this setup, a liquid mass flow $\dot{m}'_{sep}$ and a gaseous mass flow $\dot{m}''_{sep}$ can be simultaneously fed into the arrangement 10 to be calibrated which can be made, for example, in accordance with the embodiment described above. The liquid and the gaseous mass flow are each supplied via their own inlet line and their own measurement point 3', 3", for the detection of the volume flow and/or of the mass flow so that the flow of the liquid phase and of the gas phase can be detected separately. The separate volume flow and/or mass flow can be detected, for example, by means of a venturi nozzle or of an orifice plate. A respective pressure sensor and a temperature sensor are preferably each additionally provided at the measurement points 3', 3" for the separate detection of the flow of the liquid phase and of the gas phase.

The calibration of the arrangement 10 for the determination of the mass flow and of the gas/liquid ratio is advantageously carried out on the test bench as part of the acceptance test of the pump 1, with the venturi nozzles 5.1, 5.2 expediently being installed which are later used in operation. The same line arrangement is also preferably used as in later operation, since the line arrangement in operation is frequently not ideal and the standard lengths required for venturi nozzles can frequently not be observed for the straight inlet and outlet. Differences of this type from the ideal geometry are thus taken into account in the flow factors $f_{FP1}$, $f_{FP2}$ of the venturi nozzles 5.1, 5.2 of the arrangement 10.

During the calibration, the mass flow $\dot{m}'_{sep}$, $\dot{m}''_{sep}$ of the separately supplied liquid phase and gas phase is measured as is the resulting mass flow $\dot{m}_1$, $\dot{m}_2$ in the venturi nozzles 5.1, 5.2 of the arrangement 10 to be calibrated. The ratio between the mass flow $\dot{m}_1$, $\dot{m}_2$ determined by means of the venturi nozzles 5.1, 5.2 and the measurements of the separately supplied liquid phase and gas phase is taken into account in the flow factors $f_{FP1}$, $f_{FP2}$.

$$f_{FP1} = \frac{\dot{m}_1}{\dot{m}'_{sep} + \dot{m}''_{sep}} \quad (8)$$

$$f_{FP2} = \frac{\dot{m}_2}{\dot{m}'_{sep} + \dot{m}''_{sep}}$$

In equation (5), only the ratio $f_{FP1}/f_{FP2}$ is required, whereby the correction and the uncertainty associated therewith are substantially reduced.

$$F_{FP} = \frac{f_{FP1}}{f_{FP2}} \quad (9)$$

The factors $f_{FP1}$, $f_{FP2}$ and $F_{FP}$ are determined for different flow values and for different compositions of the multiphase mixture and are recorded as a function of the flow values and composition, for example as the function $f_{FP}$ or $F_{FP}=f(G, GVF, \rho^*)$ in order to determine corresponding dependencies. Here:

$$G = \dot{m}_{mix}/A = \text{mass speed}$$

$$GVF = \frac{GLR}{1+GLR} = \text{portion of the gas flow} \quad (10)$$

and $\rho^* = \rho'/\rho'' =$ ratio of liquid density and gas density.

Figure 4:
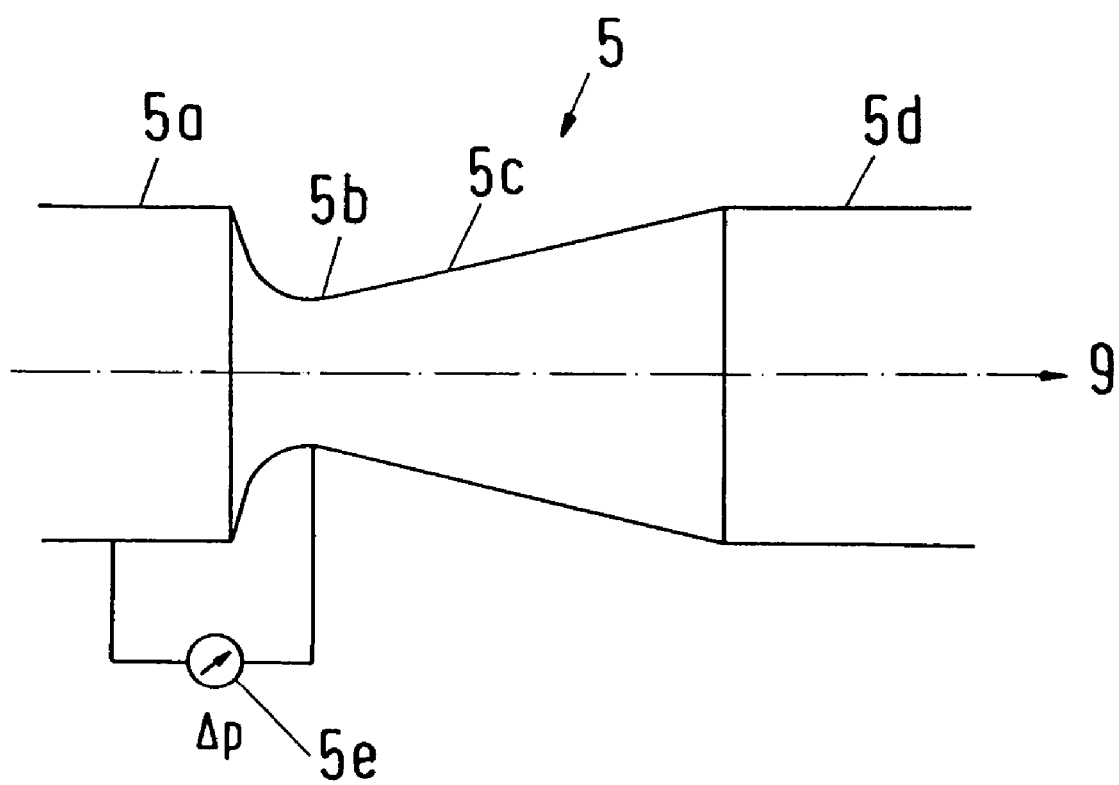
FIG. 4 shows an example of a measuring device in the form of a venturi nozzle from the embodiment shown in FIG. 1.

FIG. 4 shows an example of a measuring device in the form of a venturi nozzle from the embodiment described above. A venturi nozzle in accordance with ISO 5167 is preferably used to detect the measurement parameter correlated with the volume flow. In the example shown in FIG. 4, the venturi nozzle 5 includes—one after the other in the flow direction 9—a straight inlet line 5a with a constant cross-section, a narrowest point 5b with a reduced cross-section and a diffusor 5c which diverges in the manner of a funnel and merges into a straight outlet line 5d with a constant cross-section. In addition, a measuring sensor 5e is provided to detect the pressure differential between the inflow pressure in the inlet line 5b and the pressure at the narrowest point 5b.

The method in accordance with the invention for the determination of the mass flow and of the gas/liquid ratio in a multiphase mixture is characterized in that that it can be carried out in a simpler and more cost-favorable manner in comparison with conventional methods such as that from WO 95/26494. In addition, the values of the gas/liquid ratio determined in this manner are more accurate than the values determined with the named conventional methods. The parts used in the arrangement in accordance with the invention are robust and, with the exception of the measuring sensors of the measuring devices, do not require any additional servicing. Where required, further flow values, in particular the flow of the liquid phase and of the gas phase, can be calculated from the gas/liquid ratio determined in this manner without any additional measuring effort.

The invention claimed is:

1. A method for the determination of the mass flow and of the gas/liquid ratio in a multiphase mixture during conveying, wherein the pressure of the multiphase mixture is increased or reduced between two measurement points with a pump or a turbine;
    wherein a flow measuring device is provided each for measuring the respective volume flow at each of the two measuring points without using drive parameters of the pump or turbine;
    wherein a measurement parameter correlated with the respective volume flow is detected by each of the two flow measuring devices; and
    wherein at least one of the gas/liquid ratio, the volume flow $Q_1'$ of the liquid phase and $Q_1''$ of the gas phase, and the mass flow $m_1''$ of the liquid phase and $m_1''$ of the gas phase is determined on the basis of the detected measured parameters.

2. A method in accordance with claim 1, wherein the pump is a pump for multiphase mixtures and the turbine is an expansion turbine to increase or reduce the pressure.

3. A method in accordance with claim 1, wherein at least one of a respective venturi nozzle, an orifice plate, and a volume flowmeter is used for the detection of the measured parameters correlated with the volume flow.

4. A method in accordance with claim 1, wherein at least one of a respective pressure differential in a venturi nozzle, a pressure drop over an orifice plate, a flow rate, and the volume flow itself is detected as a measuring parameter correlated with the volume flow.

5. A method in accordance with claim 1, wherein at least one of the gas/liquid ratio is determined without the use of a separator or of a separation container and the detection of the measured values takes place in piping or a passage cross-section in a region of the measurement points that does not vary by more than 50%.

6. A method according to claim 5 wherein the piping or passage cross-section does not vary by more than 20%.

7. A method in accordance with claim 1, wherein the determined volume flow values $Q_1'$ of the liquid phase and $Q_1''$ of the gas phase or the determined mass flow values $m_1'$ of the liquid phase and $m_1''$ of the gas phase are used to one of regulate and monitor the pump or turbine.

8. A method in accordance with claim 1 including using as the pump or turbine a pump or turbine existing and operable at an installation for other purposes.

9. A method in accordance with claim 1 wherein the method includes measuring temperature and pressure at each of the two measurement points, and wherein the measured temperatures and pressures are used for the determination of the gas/liquid ratio, or the volume flow $Q_1'$ of the liquid phase, or the volume flow $Q_1''$ of the gas phase, or the mass flow $m_1'$ of the liquid phase, or the mass flow $m_1''$ of the gas phase.

10. An arrangement for the determination of a mass flow and of a gas/liquid ratio in a multiphase mixture during conveying comprising, one after the other in the conveying direction, a first flow measuring device, a pump or a turbine to increase or decrease the pressure, and a second flow measuring device, wherein each of the two flow measuring devices is a measuring device for measuring the volume flow without using drive parameters of the pump or turbine.

11. An arrangement in accordance with claim 10 including a computing unit connected to the measuring devices for the determination of at least one of a gas/liquid ratio, a volume flow $Q_1'$ of the liquid phase and $Q_1''$ of the gas phase, and a mass flow $m_1'$ of the liquid phase and $m_1''$ of the gas phase.

12. An arrangement in accordance with claim 10, wherein the pump comprises a pump for multiphase mixtures and the turbine comprises an expansion turbine.

13. An arrangement in accordance with claim 10, wherein the measuring devices for the detection of the measurement parameters correlated with the volume flow are respectively designed as at least one of a venturi nozzle, an orifice plate, and a volume flowmeter.

14. An arrangement in accordance with claim 10, wherein the measuring devices for the detection of the measurement parameters correlated with the volume flow are arranged in piping or the measuring devices are made such that a passage cross-section in the region of the measuring devices does not vary by more than 50%.

15. An arrangement in accordance with claim 14 wherein the passage cross-section in the region of the measuring device does not vary by more than 20%.

16. A conveying system for multiphase mixtures including an arrangement in accordance with claim 10.

17. An arrangement in accordance with claim 10 wherein a rising pipe existing and operable at an installation for other purposes is used to reduce or increase the pressure.

18. An arrangement in accordance with claim 10 including measuring devices to detect the temperature and pressure at each of the two measurement points.

19. A method for the determination of a mass flow and of a gas/liquid ratio in a multiphase mixture during conveying, wherein the pressure of the multiphase mixture is increased or reduced between two measurement points with a rising pipe;
wherein a flow measuring device is provided each for measuring the respective volume flow at each of the two measuring points independently of each other;
wherein a measurement parameter correlated with the respective volume flow is detected by each of the two flow measuring devices; and
wherein at least one of the gas/liquid ratio, the volume flow $Q_1'$ of the liquid phase and $Q_1''$ of the gas phase, and the mass flow $m_1'$ of the liquid phase and $m_1''$ of the gas phase is determined on the basis of the detected measured parameters.

20. An arrangement in accordance with claim 19 including measuring devices to detect the temperature and pressure at each of the two measurement points.

21. An arrangement for the determination of a mass flow and of a gas/liquid ratio in a multiphase mixture during conveying comprising, one after the other in the conveying direction, a first flow measuring device for measuring the volume flow, a rising pipe to increase or decrease the pressure, and a second flow measuring device for measuring the volume flow independently of the first measuring device.

* * * * *